United States Patent
Hu et al.

(10) Patent No.: US 7,166,009 B2
(45) Date of Patent: Jan. 23, 2007

(54) METHOD FOR MAKING A FIELD EMISSION DISPLAY

(75) Inventors: Zhaofu Hu, Beijing (CN); Pijin Chen, Beijing (CN); Liang Liu, Beijin (CN); Shou Shan Fan, Beijing (CN)

(73) Assignees: Tsinghua University, Beijing (CN); Hon Hai Precision Ind. Co., Ltd., Tu-Cheng (TW)

( * ) Notice: Subject to any disclaimer, the term of this patent is extended or adjusted under 35 U.S.C. 154(b) by 250 days.

(21) Appl. No.: 10/810,024

(22) Filed: Mar. 26, 2004

(65) Prior Publication Data

US 2004/0189183 A1     Sep. 30, 2004

(30) Foreign Application Priority Data

Mar. 26, 2003    (CN)    ................. 03 1 14070

(51) Int. Cl.
*H01J 9/00* (2006.01)
*H01J 9/02* (2006.01)
*H01J 9/40* (2006.01)

(52) U.S. Cl. ......................................... 445/24; 445/25

(58) Field of Classification Search ........ 313/495–497; 445/24, 25
See application file for complete search history.

(56) References Cited

U.S. PATENT DOCUMENTS 6,366,009  B1    4/2002    Smith et al.
6,515,415  B1    2/2003    Han et al.
6,525,462  B1    2/2003    Kim
6,541,906  B1    4/2003    Lee et al.
2005/0122030  A1*  6/2005  Sakamoto et al. .......... 313/496

OTHER PUBLICATIONS

"Helical Microtubules of Graphitic Carbon" Nature, vol. 354, Nov. 7, 1991, pp. 56-58.

* cited by examiner

*Primary Examiner*—Mariceli Santiago
(74) *Attorney, Agent, or Firm*—Wei Te Chung

(57) ABSTRACT

A method for making a field emission display includes the following steps: providing a substrate (11); forming cathode electrodes (21) on the substrate; forming carbon nanotubes (31) on the cathode electrodes; forming a barrier array (41); forming gate electrodes (51) on the barrier array; fixing the barrier array with the gate electrodes to the substrate; packaging a phosphor screen (71) with the substrate. The barrier array is formed by depositing an insulative layer (43) on a shadow mask which defines a plurality of openings (42) according to a pixel pattern of the field emission display. This method employs the known technology for making a shadow mask in the field of CRTs. In addition, the thickness and the material of the insulative layer can be determined according to the insulative performance required for the field emission display. In summary, the present invention provides a field emission display having a barrier array with high precision and low production costs.

17 Claims, 2 Drawing Sheets

METHOD FOR MAKING A FIELD EMISSION DISPLAY

BACKGROUND OF THE INVENTION

1. Field of the Invention

The present invention relates to a method for making a flat panel display. Specifically, the present invention relates to a method for making a field emission display which has an improved barrier array.

2. Description of Prior Art

Field emission displays are well known in the art and are widely used since they have a small volume, low power consumption, high contrast ratio, large viewing angle and are suitable for mass production. In an FED device, electrons are emitted from tips formed on cathode electrodes by applying a voltage to the tips. The electrons impinge on a phosphor screen formed on a back of a transparent plate and thereby produce an image.

A conventional field emission display employs metal microtips as emitters. However, it is difficult to precisely fabricate extremely small metal microtips for the field emission source. This difficulty greatly limits miniaturization of a conventional field emission display. In addition, metal microtips themselves are prone to wear out after a long period of use.

Carbon nanotubes produced by arc discharge between graphite rods were first discovered and reported in an article by Sumio Iijima entitled "Helical Microtubules of Graphitic Carbon" (Nature, Vol. 354, Nov. 7, 1991, pp. 56–58). Carbon nanotubes have excellent mechanical properties, high electrical conductivity, nano-size tips, and other advantages. Due to these properties, it has been suggested that carbon nanotubes could be an ideal material for field emission applications.

In both convention field emission displays that use metal microtips as emitters and in field emission displays that use carbon nanotubes as emitters, a barrier array is used to separate and insulate the cathode and the gate electrodes. To achieve superior display quality, the barrier array should be made with high accuracy and uniformity throughout the entire barrier array, and the material of which the barrier array is made should not be porous, since otherwise air may become trapped in the pores. Furthermore, such applications as field emission display demands that the barrier have a flat upper surface and highly accurate height. Thus manufacturing the barrier array is a critical step in making a field emission display.

The two main methods for making barrier arrays in the art are the screen printing method and the sandblasting method. In the screen printing method, a barrier array is formed by repeatedly screen printing and drying paste material on a substrate, and then baking the assembly. However, during the repeated printing and drying procedure, it is difficult to ensure that the barrier array has a flat upper surface and uniform height, and this leads to increases in production costs. In addition, it is also difficult to fabricate the barrier array to a high precision when using the screen printing method. Thus, screen printing is not suitable for mass production of high quality barrier arrays used in field emission displays.

In the sandblasting method, which is widely used, material for the barrier array is applied to a substrate at a predetermined thickness, and then dried. Then a protective film having the shape of the desired barrier array is formed on the assembly, or a sand blasting mask is attached to the assembly. Sand is injected at high pressure so that unwanted portions of the material are removed, thus forming the barrier array. Finally, the barrier array is baked. However, the whole manufacturing process takes a considerable time, and control of the sand injection must be highly accurate. The sandblasting method is not very reliable, and is also prone to contaminate the manufacturing environment with sand.

Other methods for making barrier arrays for flat panel displays comprise photolithography, molding, and casting. However, all these methods require mating of a substrate with suitable pastes, as well as drying and baking processes. This makes these methods unduly time-consuming. Furthermore, it is difficult to fabricate barrier arrays using these methods to a high precision.

As described above, these difficulties of barrier array manufacturing greatly limit mass production of field emission displays having high precision.

SUMMARY OF THE INVENTION

In view of the above-described drawbacks, an object of the present invention is to provide a method for making field emission displays which have a high precision barrier array.

Another object of the present invention is to provide a method for making field emission displays which is low cost and suitable for mass production.

A further object of the present invention is to provide a method for making field emission displays having a barrier array, the method being environmentally friendly.

In order to achieve the objects set out above, a preferred method for making a field emission display having a barrier array in accordance with the present invention comprises the following steps: providing a substrate; forming cathode electrodes on the substrate; forming carbon nanotubes on the cathode electrodes; forming a barrier array; forming gate electrodes on the barrier array; fixing the barrier array with the gate electrodes to the substrate; and packaging a phosphor screen with the substrate. In this method, the barrier array is formed by depositing an insulative layer on a shadow mask, which defines a plurality of openings according to a pixel pattern of the field emission display. This method employs the known technology for making a shadow mask in the field of CRTs. In addition, a thickness and a material of the shadow mask can be selected according to the particular requirements of the field emission display required. Furthermore, the thickness and the material of the insulative layer can be determined by the insulative performance required for the field emission display. Moreover, the barrier array may be formed in sufficient size that it can be subdivided for use in one or more field emission displays. In summary, the present invention provides a field emission display having a barrier array made to a high degree of precision which is low in production cost. The barrier arrays are also suitable for mass production in an environmentally friendly manner.

Other objects, advantages and novel features of the present invention will become more apparent from the following detailed description when taken in conjunction with the accompanying drawings, in which:

DETAILED DESCRIPTION OF PREFERRED EMBODIMENTS OF THE INVENTION

Figure 1:
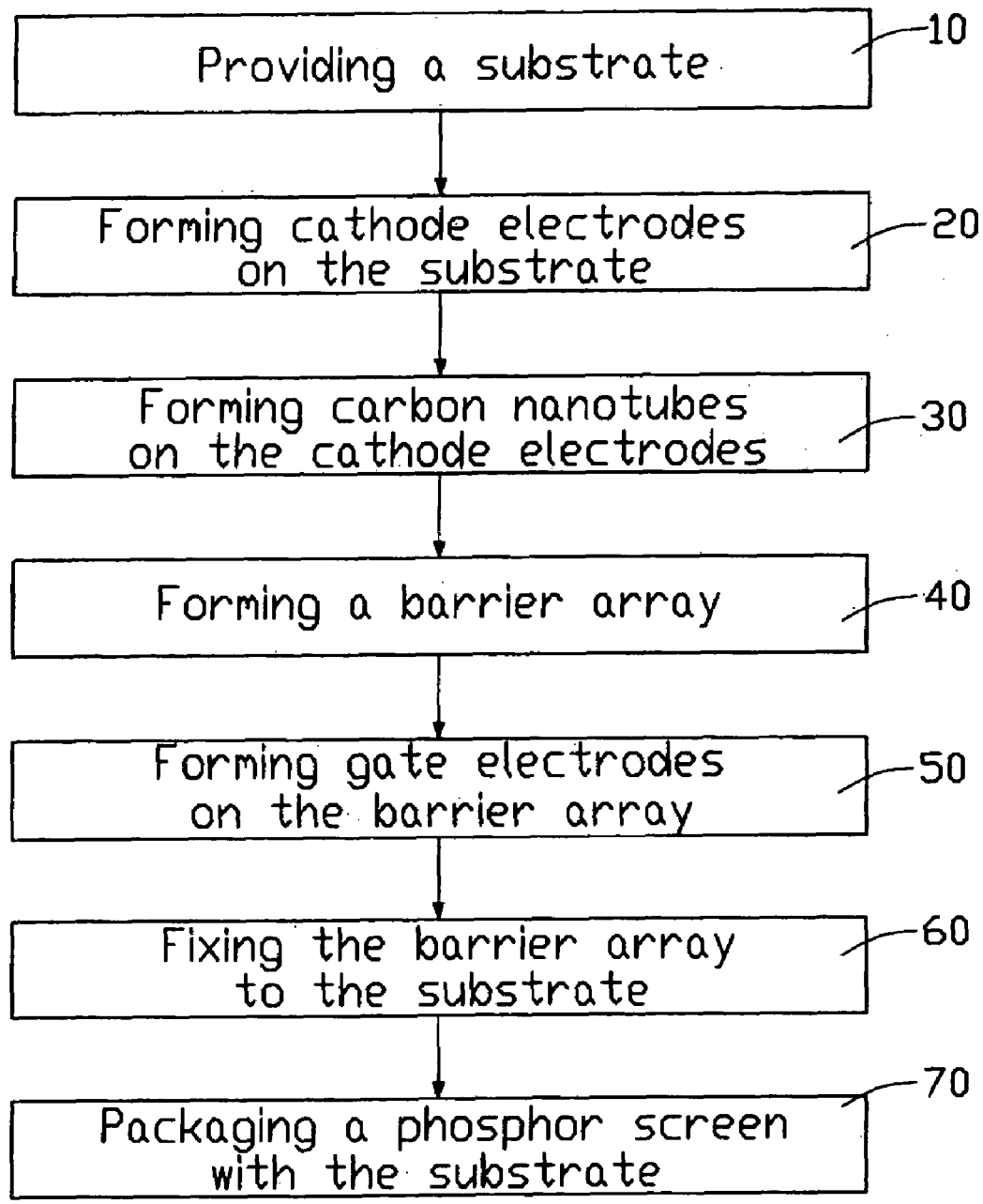
FIG. 1 is a flowchart of a preferred method for making a field emission display having a barrier array according to the present invention.

A preferred method for making a field emission display having a barrier array according to the present invention will be described with reference to the flowchart of FIG. 1.

Figure 2:
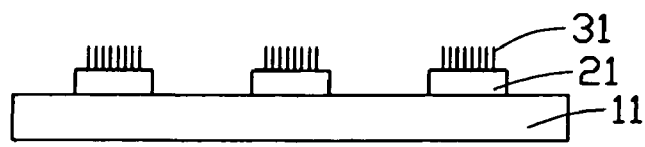
FIG. 2 is a schematic side view of a substrate with cathode electrodes and carbon nanotubes formed thereon according to the preferred method.

Referring to FIG. 2, a substrate 11 is first provided (step 10). The substrate 11 can be glass, ceramic, silicon oxide, alumina or another suitable insulative material having a surface with a total thickness variation of less than 1 micrometer. The substrate 11 must endure the temperatures at which carbon nanotubes grow, generally being temperatures higher than 700° C. Cathode electrodes 21 are formed on the substrate 11 by electroplating or magnetron sputtering (step 20).

Carbon nanotubes 31 are then formed on the cathode electrodes 21 (step 30). The carbon nanotubes 31 can be formed on the cathode electrodes 21 by directly growing them on the cathode electrodes 21, or by transplanting preformed carbon nanotubes onto the cathode electrodes 21. The preformed carbon nanotubes can be formed on a silicon substrate by chemical vapor deposition. Then, the preformed carbon nanotubes can be transplanted onto the cathode electrodes 21 using electrically conductive adhesive.

A preferred method for growing the carbon nanotubes 31 directly on the cathode electrodes 21 comprises the following steps: depositing a silicon layer (not shown) on the cathode electrodes 21 to a thickness of several tens of nanometers; depositing a catalyst layer on the silicon layer to a thickness in the range from 1 nanometer to several tens of nanometers, the catalyst layer being iron, cobalt, nickel or any suitable combination alloy thereof; annealing the catalyst layer at 300~400° C. for almost 10 hours; heating the cathode electrodes 21 with the catalyst layer up to 650~700° C. in flowing protective gas; introducing a carbon source gas, such as acetylene; and thus forming carbon nanotubes 31 extending from the cathode electrodes 21.

An alternative method for growing the carbon nanotubes 31 directly on the cathode electrodes 21 is similar to the above-described preferred method, except for the following. The cathode electrodes 21 are oxidized to form an oxidized layer having a thickness of less than 1 micrometer on a surface of the cathode electrodes 21, the oxidization being performed instead of depositing the silicon layer on the cathode electrodes 21. Other steps of the alternative method are the same as the above-described preferred method, such as: depositing a catalyst layer on the oxidized layer of the cathode electrodes 21, annealing the catalyst layer, heating the cathode electrodes 21 with the catalyst layer in flowing protective gas; introducing a carbon source gas; and thus forming carbon nanotubes 31.

Figure 3:
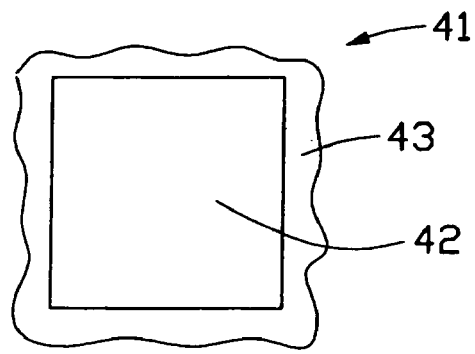
FIG. 3 is a schematic plan view of a part of a barrier array used in the field emission display made according to the preferred method, said part comprising a single barrier.

FIG. 3 is a schematic plan view of part of a barrier array 41 used in the field emission display according to the preferred method, said part comprising a single barrier. The barrier comprises a part of a shadow mask defining an opening 42 therethrough and having an insulative layer 43 formed thereon. A method for making the barrier array 41 (step 40) comprises the following steps: providing a metal plate; using the metal plate to form the shadow mask; and forming the insulative layer 43 on the shadow mask. The metal plate can be made from invar (an alloy of iron and nickel), low carbon steel, or another suitable metal alloy that has a coefficient of thermal expansion matching that of the substrate of the field emission display. A thickness of the insulative layer 43 is in the range from 10 to 500 micrometers, and preferably in the range from 75 to 200 micrometers.

A mask is provided prior to forming the shadow mask. The mask has a predetermined pattern corresponding to a pixel pattern of the field emission display. The shadow mask 42 is then formed by photolithographic etching, using the mask. Thus, the shadow mask also has the predetermined pattern. The pattern comprises a plurality of openings 42 evenly arranged in an array according to the pixel pattern of the field emission display. The insulative layer 43 can be formed by electrophoretic deposition, spray coating, or another suitable method. Preferably, the electrophoretic deposition method is employed. The insulative layer can be alumina, magnesia or another insulative material selected according to a required insulative performance of the field emission display.

In the preferred method of making the barrier array 41, alumina is used as the insulative material, and electrophoretic deposition is need to form the insulative layer 43. In the electrophoretic deposition, the shadow mask is used as an anode, and aluminum metal is used as a cathode. An electrolyte comprises aluminum ions. In the preferred method, the electrolyte comprises methyl alcohol (600 ml), magnesium sulfate (6 g), aluminum nitrate (30 ml), alumina (900 g) and deionized water (600 ml). The time needed for the electrophoretic deposition is determined by a required thickness of the insulative layer of the field emission display, which in turn is determined according to a required insulative performance of the field emission display.

The barrier array 41 is formed once an insulative layer 43 of alumina material has been deposited on the shadow mask to a predetermined thickness. After the insulative layer 43 has been deposited on the shadow mask, the barrier array 41 is preferably soaked in a solution for a predetermined time to clean surfaces of the barrier array. In the preferred method, the solution comprises ethyl cellulose (85 g), butyl alcohol (60 ml) and xylene (3400 ml, 3°), and the predetermined time is 1~5 minutes. Then, the barrier array 41 is cured.

Figure 4:
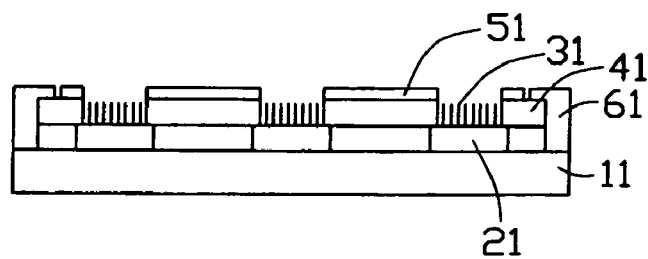
FIG. 4 is a schematic side view of the barrier array with gate electrodes formed thereon being fixed to the substrate according to the preferred method.

The barrier array 41 is then attached to a frame 61 having a fixing surface (not shown), and is flattened by applying stress thereto. Gate electrodes 51 are then formed on the barrier array 41 by electron beam evaporation, thermal evaporation, or sputtering (step 50). The barrier array 41 with the gate electrodes 51 formed thereon and the frame 61 are together fixed to the substrate 11 using powdered glass having a low melting point to fuse the frame 61 to the substrate 11 (step 60) (shown in FIG. 4).

Figure 5:
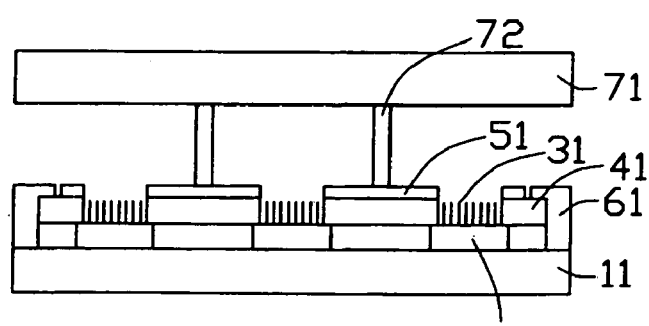
FIG. 5 is a schematic side view of the field emission display after packaging a phosphor screen with the substrate according to the preferred method.

FIG. 5 shows a phosphor screen 71 packaged with the substrate 11 (step 70). Preferably, supporting members 72 are employed to both support the phosphor screen 71 and to clamp the barrier array to the substrate to assure that the barrier array lies flat against the substrate 11.

It will be apparent to those having skill in the field of the present invention that the method of the present invention is not only suitable for field emission displays that employ carbon nanotubes as emitters, but is also suitable for field emission displays that employ metal microtips as emitters.

An alternative method for making a field emission display according to the present invention comprises the following steps: providing a substrate 11; forming cathode electrodes 21 on the substrate 11; forming a catalyst layer on the cathode electrodes 21; forming a barrier array 41 employing the same method as described in relation to the preferred method; forming gate electrodes 51 on the barrier array 41; fixing the barrier array with the gate electrodes 51 formed thereon to the substrate 11 to form an assembly; putting the assembly into a furnace and introducing a carbon source gas to form carbon nanotubes at predetermined positions which are defined by the barrier array; and packaging a phosphor screen 71 with the substrate 11. Because the barrier array is put into the furnace and sustains a temperature at which carbon nanotubes can grow, the means by which the barrier array is fixed to the substrate 11 must be altered to another means, such as welding, or employing suitable clips.

Because making a shadow mask is a known technology in the field of CRTs, the above-described preferred and alternative methods according to the present invention can be conveniently employed. In addition, a thickness and a material of the shadow mask can be selected according to the particular requirements of the field emission display desired. Furthermore, the thickness and the material of the insulative layer 43 can be determined according to the insulative performance required for the field emission display. Moreover, the barrier array may be formed in sufficient size that it can be subdivided for use in one or more field emission displays. In summary, the present invention provides a field emission display having a barrier array made to a high degree of precision which is low in production cost. The barrier array is also suitable for mass production in an environmentally friendly manner.

It is understood that the invention may be embodied in other forms without departing from the spirit thereof. Thus, the present examples and embodiments are to be considered in all respects as illustrative and not restrictive, and the invention is not to be limited to the details given herein.

The invention claimed is:

1. A method for making a field emission display comprising the following steps:
   providing a substrate;
   forming cathode electrodes on the substrate, the cathode electrodes together with the substrate defining a pixel pattern;
   forming a barrier array;
   forming gate elect-odes on the barrier array the barrier array comprising a shadow mask and an insulative layer formed on the shadow mask, the shadow mask defining a plurality of openings according to the pixel pattern of the field emission display;
   fixing the barrier array with the gate electrodes to the substrate; and
   packaging a phosphor screen with the substrate.

2. The method for making a field emission display as described in claim 1, wherein the substrate can be glass, ceramic, silicon oxide, alumina or another suitable insulative material having a surface with a total thickness variation less than 1 micrometer.

3. The method for making a field emission display as described in claim 1, wherein the method further comprises the step of providing a mask having a pattern according to the pixel pattern.

4. The method for making a field emission display as described in claim 1, wherein the shadow mask is made from a material selected from the group: invar, low carbon steel, or another suitable metal alloy, and the material has a coefficient of thermal expansion matching that of the substrate.

5. The method for making a field emission display as described in claim 1, wherein the insulative layer comprises alumina or magnesia.

6. The method for making a field emission display as described in claim 5, wherein a thickness of the insulative layer is in the range from 10 to 500 micrometers.

7. The method for making a field emission display as described in claim 5, wherein the insulative layer is formed on the shadow mask by spray coating.

8. The method for making a field emission display as described in claim 5, wherein the insulative layer is formed on the shadow mask by electrophoretic deposition.

9. The method for making a field emission display as described in claim 8, wherein, after the insulative layer has been deposited on the shadow mask, the barrier array is preferably soaked in a solution for a predetermined time to clean surfaces of the barrier array.

10. The method for making a field emission display as described in claim 1, wherein the gate electrodes are formed on the barrier array by electron beam evaporation, thermal evaporation or sputtering.

11. The method for making a field emission display as described in claim 1, wherein the method further comprises a step of attaching the barrier array to a frame having a fixing surface.

12. The method for making a field emission display as described in claim 1, wherein the barrier array with the gate electrodes formed thereon is fixed to the substrate by means selected from fusing powdered glass having a low melting point, welding or employing suitable clips.

13. The method for making a field emission display as described in claim 1, wherein emitters employed by the field emission display comprise carbon nanotubes or metal microtips.

14. A method for making a field emission display comprising the following steps:
   providing a substrate;
   forming cathode electrodes on the substrate, the cathode electrodes together with the substrate defining a pixel pattern;
   providing a metal plate defining a plurality of openings according to the pixel pattern with an insulative layer formed thereon;
   forming gate electrodes on the insulative layer;
   fixing the metal plate with the insulative layer formed thereon to the substrate; and
   packaging a phosphor screen with the substrate.

15. The method for making a field emission display as described in claim 14, wherein emitters employed by the field emission display comprise carbon nanotubes or metal microtips.

16. The method for making a field emission display as described in claim 14, wherein the metal plate is selected from the group: invar, low carbon steel, or other suitable metal alloys, and the metal plate has a thermal expansion coefficient matching that of the substrate.

17. The method for making a field emission display as described in claim 14, wherein the metal plate with the insulative layer formed thereon is fixed to the substrate by means selected from fusing powdered glass having a low melting point, welding or employing suitable clips.

* * * * *